(12) United States Patent
Kayano et al.

(10) Patent No.: US 6,561,052 B2
(45) Date of Patent: May 13, 2003

(54) AUTOMATIC TRANSMISSION

(75) Inventors: Mitsuo Kayano, Hitachi (JP); Ryouichi Naganuma, Hitachinaka (JP); Toshimichi Minowa, Mito (JP); Hiroshi Ohnishi, Hitachinaka (JP); Takashi Okada, Hitachi (JP); Tatsuya Ochi, Hitachi (JP); Hiroshi Sakamoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/798,984

(22) Filed: Mar. 6, 2001

(65) Prior Publication Data

US 2001/0025539 A1 Oct. 4, 2001

(30) Foreign Application Priority Data

Apr. 4, 2000 (JP) ......................................... 2000-102267

(51) Int. Cl.⁷ ................................................ F16H 3/38
(52) U.S. Cl. ............................. 74/339; 74/331; 74/333; 74/335; 74/359
(58) Field of Search .......................... 74/331, 333, 335, 74/359, 375, 339, 325

(56) References Cited

U.S. PATENT DOCUMENTS

| | | | | |
|---|---|---|---|---|
| 4,913,004 A | * | 4/1990 | Panoushek et al. | 477/143 |
| 5,006,102 A | * | 4/1991 | Takase et al. | 475/282 |
| 5,713,425 A | * | 2/1998 | Buschhaus et al. | 180/297 |
| 5,718,148 A | * | 2/1998 | Bender | 475/198 |
| 5,730,683 A | * | 3/1998 | Usuki et al. | 477/143 |
| 5,944,630 A | * | 8/1999 | Omote | 477/5 |
| 5,970,811 A | * | 10/1999 | Imao et al. | 74/335 |
| 5,974,906 A | * | 11/1999 | Stine et al. | 477/124 |
| 6,073,507 A | * | 6/2000 | Ota et al. | 477/906 |
| 6,135,913 A | * | 10/2000 | Lyon | 180/165 |
| 6,155,126 A | * | 12/2000 | Vogt et al. | 74/335 |
| 6,164,149 A | * | 12/2000 | Ohmori et al. | 477/121 |
| 6,196,077 B1 | * | 3/2001 | Lee | 74/335 |
| 6,241,066 B1 | * | 6/2001 | Asada et al. | 192/3.51 |
| 6,251,045 B1 | * | 6/2001 | Oliveira et al. | 475/303 |
| 6,257,084 B1 | * | 7/2001 | Yoshina et al. | 74/359 |
| 6,276,224 B1 | * | 8/2001 | Ueda et al. | 74/335 |
| 6,286,379 B1 | * | 9/2001 | Yester et al. | 475/204 |
| 6,319,171 B1 | * | 11/2001 | Hughes et al. | 477/111 |
| 6,332,257 B1 | * | 12/2001 | Reed et al. | 29/401.1 |
| 6,370,977 B1 | * | 4/2002 | Kubo et al. | 74/339 |

OTHER PUBLICATIONS

Bosch Automotive Handbook 3rd Edition Setp 1993.*

* cited by examiner

*Primary Examiner*—Christopher P. Schwartz
*Assistant Examiner*—Devon Kramer
(74) *Attorney, Agent, or Firm*—Crowell & Moring LLP (57) ABSTRACT

A mesh type automatic transmission is equipped with a plurality of shift gears arranged to rotate freely to an output shaft for providing driving force to the wheels. Cogged clutches 12, 15 engage with the output shaft. Counter shift gears corresponding to each speed are fixed to a counter shaft rotated by the rotation of an input shaft and mesh with the shift gears for performing automatic shifting by controlling engagement of one of the cogged clutches with the voluntary shift gears determined from the accelerator command value and the vehicle speed. An assist mechanism transmits rotational force of the input shaft to the output shaft via the assist shaft which rotates from the rotation of the counter shaft when no cogged clutch of the plurality of cogged clutches is engaged with any of the plurality of shift gears occurring during switching when an engaged cogged clutch of the plurality of cogged clutches is disengaged and one of the cogged clutch of the plurality of cogged clutches is to be engaged.

20 Claims, 7 Drawing Sheets

AUTOMATIC TRANSMISSION

FIELD OF THE INVENTION

The present invention relates to an automatic transmission.

DESCRIPTION OF THE RELATED ART

Heretofore, there is known an automatic transmission using a mechanism of a conventional manual transmission, that is, mesh gear type transmission as the transmission device, which is provided with a clutch for engaging and disengaging the engine with the transmission, and an actuator for moving the clutch for engaging and disengaging each gear with the output shaft, and which performs automatic shifting by controlling hydraulic pressure to the actuator for performing engagement and disengagement of the clutch.

SUMMARY OF THE INVENTION

In a conventional automatic transmission thus constituted, there exists a condition where the cogged clutch is engaged to none of the gears, that is, a neutral condition.

In such neutral condition, in the case where the gear is shifted from the 1st gear to the 2nd gear, from the 2nd gear to the 3rd gear, from the 3rd gear to the 4th gear, and from the 4th gear to the 5th gear, the driver feels a state of shock as if the vehicle has decelerated, even when the vehicle is accelerating, because the acceleration power is not transmitted during neutral condition. This results in poor drivability.

The object of the present invention is to provide an automatic transmission that moderates the shock originated at engagement and disengagement of the clutch during acceleration.

In order to achieve the above-mentioned object, the present invention provided an assist mechanism for transmitting rotational force of an input shaft to an output shaft, in the period when no cogged clutch other than a starting clutch is engaged with any of a plurality of shift gears, during switching of the cogged clutch.

According to another aspect of the present invention, an assist mechanism for transmitting rotational force of the input shaft to the output shaft, by transmitting rotation of an assist shaft rotated by the rotation of a counter shaft to the output shaft via an assist gear, in the period when the gear currently engaged is disengaged and a new gear is to be engaged, during shifting. The assist mechanism is preferably provided so that the assist shaft is deviated from a line connecting a central axis of the counter shaft rotated by the power of the input shaft, with a central axis of the output shaft which is engaged with the plurality of cogged clutches, is fit with the plurality of shift gears so as to rotate freely, and which outputs rotation of the counter shaft with the gear shifted according to need, and a central axis of the assist shaft is positioned below the central axis of the counter shaft.

According to still another aspect of the present invention, an assist mechanism for transmitting rotational force of the input shaft to the output shaft by the assist shaft, by transmitting rotation of the counter shaft to the assist shaft via the assist gear, in the period when the gear currently engaged is disengaged and a new gear is to be engaged during shifting, is provided inside a transmission case on the side of a gear oil injection hole, and is provided so that the assist shaft is provided to the position below a line perpendicular to a line connecting a central axis of the output shaft with a central axis of the counter shaft at the center of said output shaft.

According to still another aspect of the present invention, an assist mechanism for transmitting rotational force of the input shaft to the output shaft by the assist shaft, by transmitting rotation of the counter shaft to the assist shaft via the assist gear, in the period when the gear currently engaged is disengaged and a new gear is to be engaged during shifting, is provided so that the assist shaft is positioned on the opposite side of the output shaft relative to a horizontal line passing the center of the counter shaft.

According to still another aspect of the present invention, an assist mechanism for transmitting rotational force of the input shaft to the output shaft by the assist shaft, by transmitting rotation of the counter shaft to the assist shaft via the assist gear, in the period when the gear currently engaged is disengaged and a new gear is to be engaged during shifting, is provided to the position opposite to the side of the engine and the starting clutch, based on the position of the counter shaft.

According to still another aspect of the present invention, an assist mechanism for transmitting rotational force of the input shaft to the output shaft by the assist shaft, by transmitting rotation of the counter shaft to the assist shaft via the assist gear, in the period when the gear currently engaged is disengaged and a new gear is to be engaged during shifting, is provided so that the assist shaft is provided to the opposite side of the output shaft relative to a horizontal axis passing the center of the counter shaft, as well as to the position opposite to the side of the engine and the starting clutch, based on the position of the counter shaft.

Preferably, the assist mechanism starts engaging when a switch command for the cogged clutch is output, before the cogged clutch currently engaged with the shift gear is completely disengaged, engages according to torque of the engine and transmits rotational force of the input shaft to the output shaft, when the cogged clutch is completely disengaged from the engaged shift gear, and disengages when the cogged clutch is engaged with the shift gear to be engaged based on the switch command.

Preferably, the assist mechanism comprising the assist shaft rotating from the rotational force of the counter shaft, the assist input gear meshing with the counter assist gear fixed to the counter shaft and being mounted to the assist shaft so as to rotate freely, the assist output gear meshing with the counter gear of the highest gear mounted to the counter shaft so as to rotate freely and being fixed to the assist shaft, and the assist clutch for engaging the assist input gear with the counter shaft, transmits rotation of the assist input gear to the output shaft via the assist shaft and the assist output gear, based on an assist command.

DETAILED DESCRIPTION OF PREFERRED EMBODIMENTS

The operation of the automatic transmission according to the present invention will be explained below referring to FIG. 1 through FIG. 7.

Figure 1:
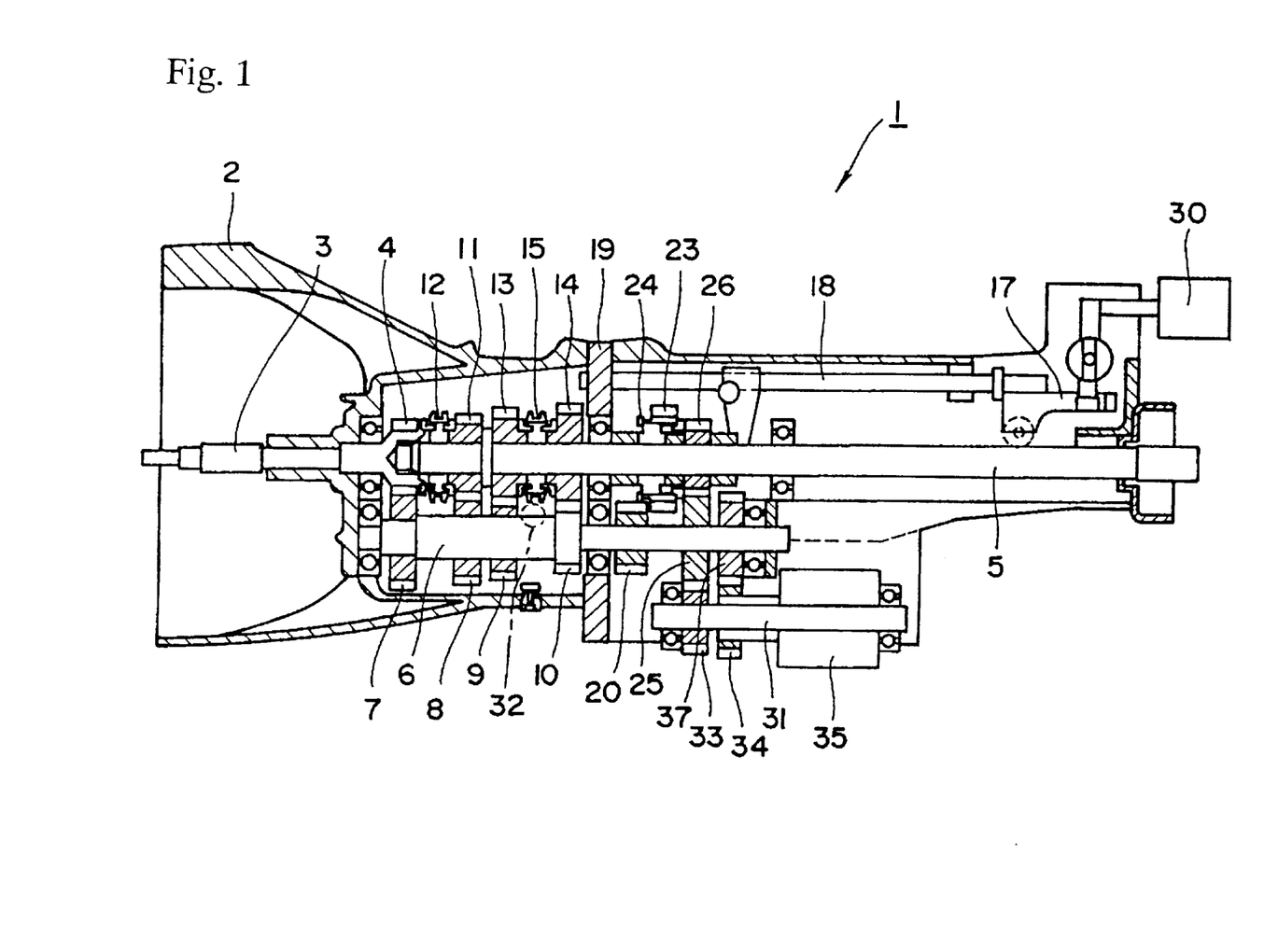
FIG. 1 is an overall structural view of the automatic transmission comprising an embodiment of the present invention.
Figure 2:
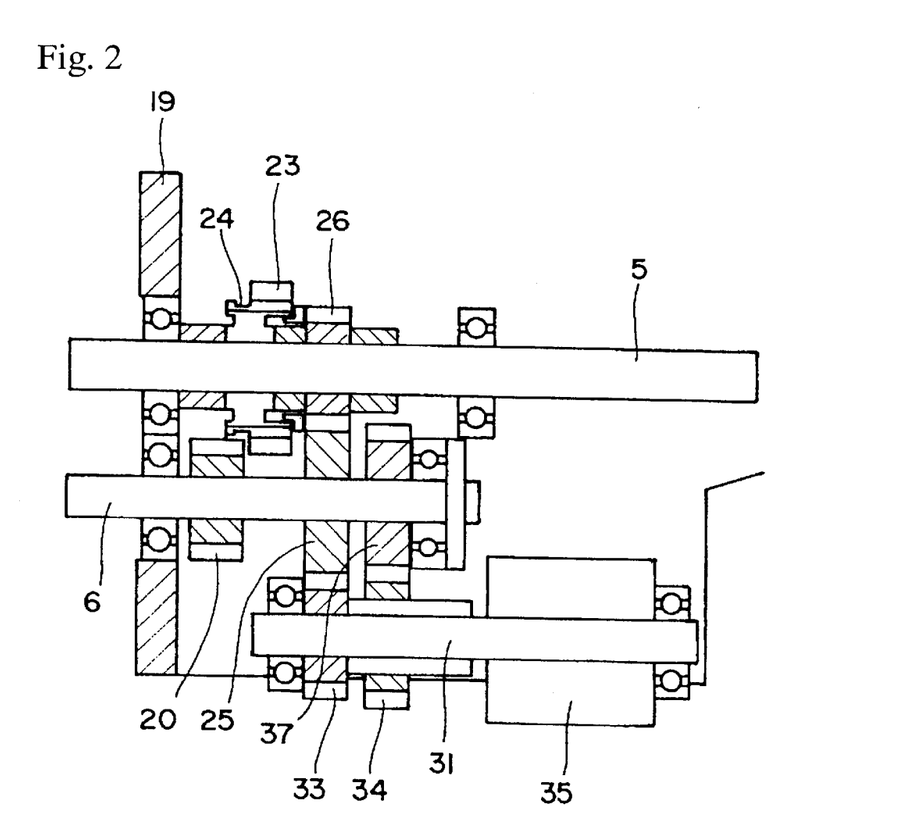
FIG. 2 is an enlarged view of the assist mechanism shown in FIG. 1.
Figure 3:
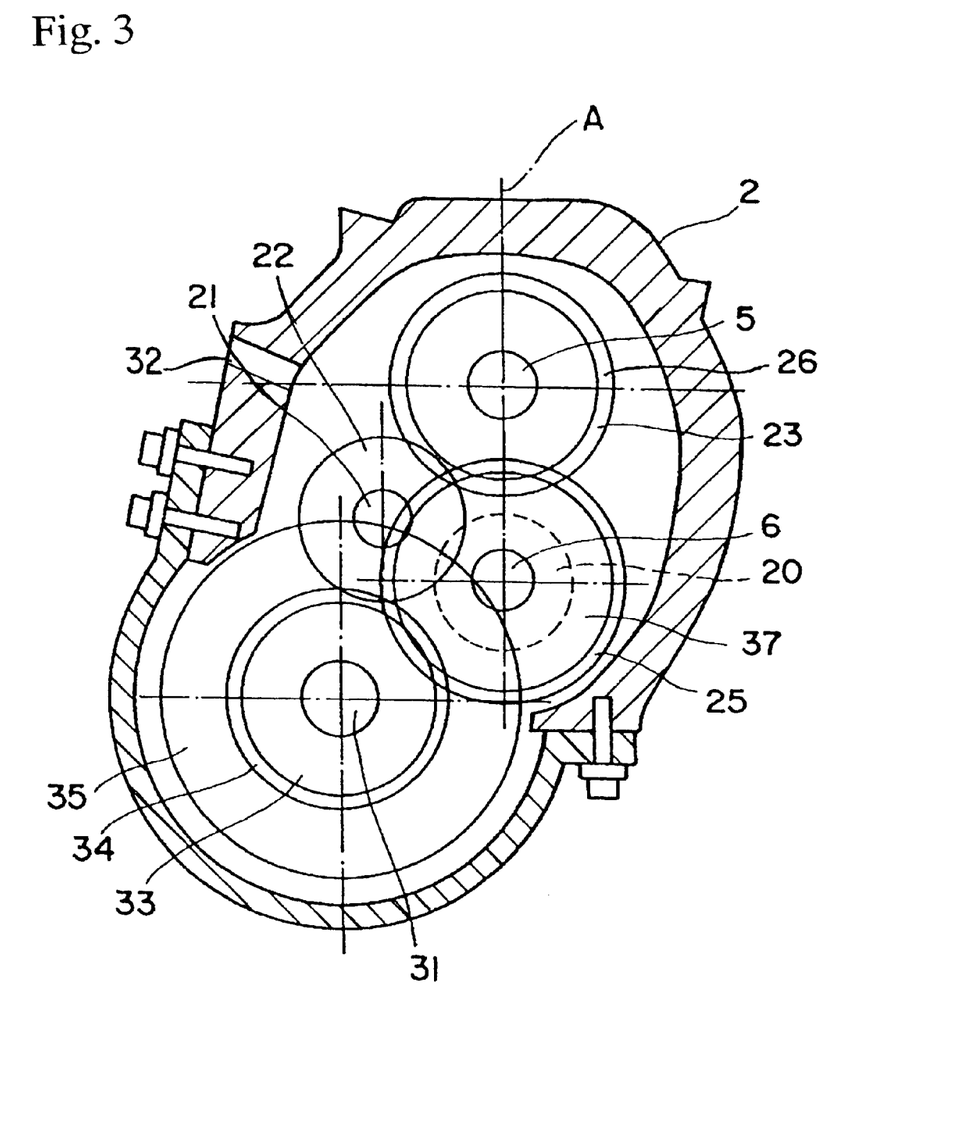
FIG. 3 is a right side view of the automatic transmission shown in FIG. 1.
Figure 4:
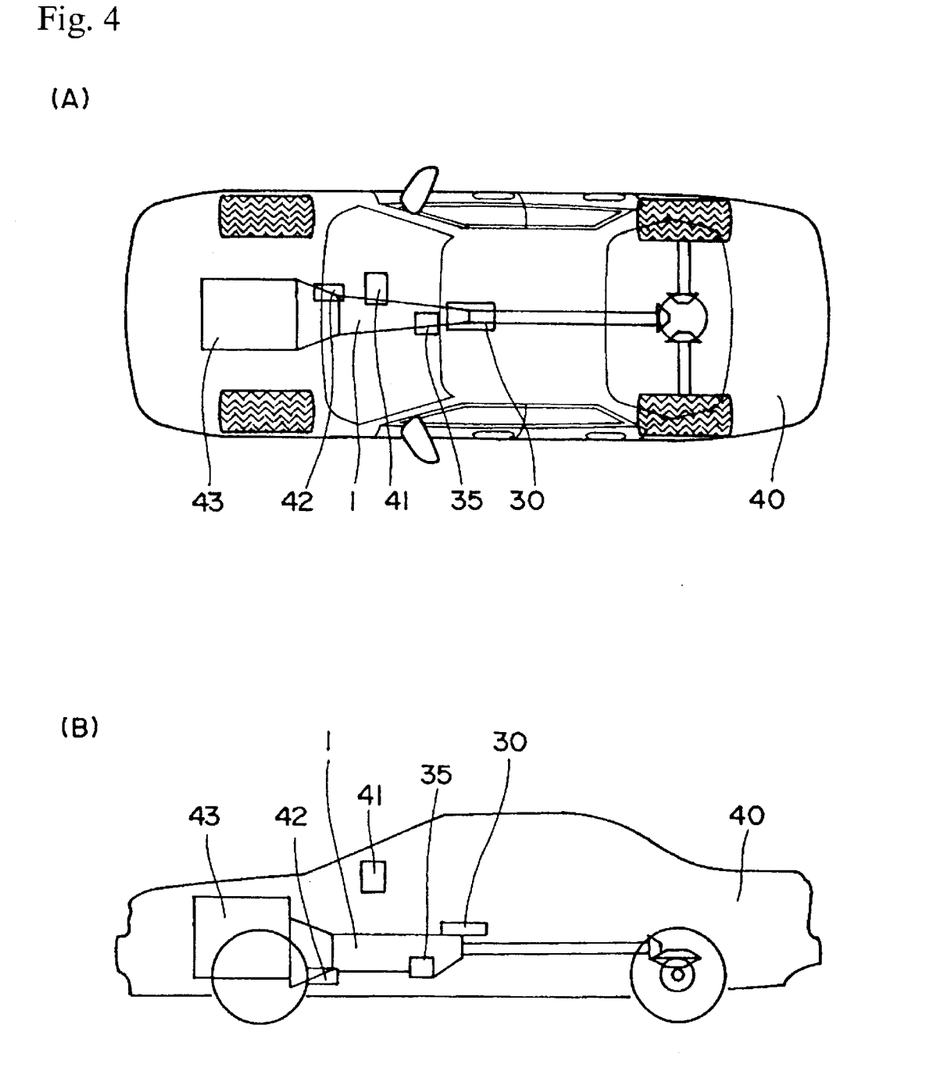
FIG. 4 is a view indicating the position where the automatic transmission according to the present invention is provided in a car body of an automobile.
Figure 5:
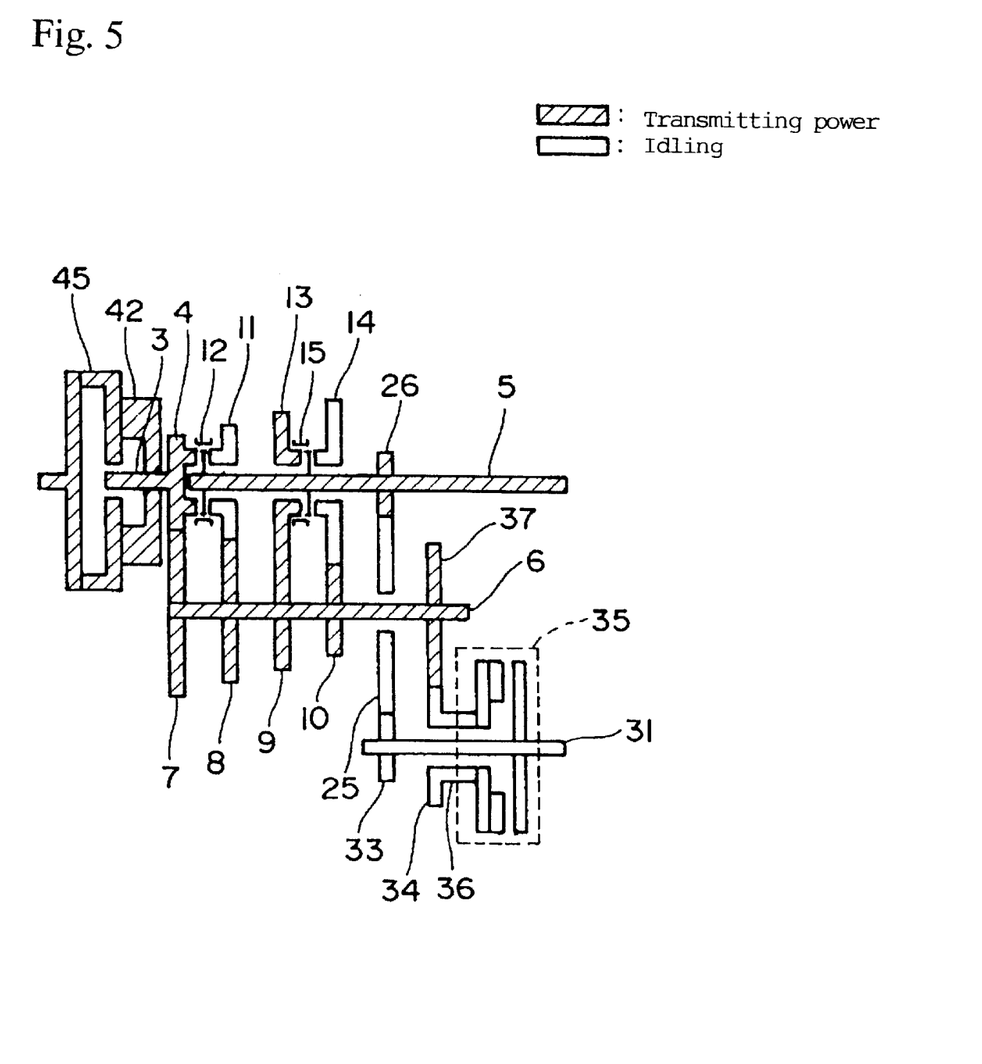
FIG. 5 is a view explaining the engaging and disengaging operation of the assist mechanism during shifting.
Figure 6:
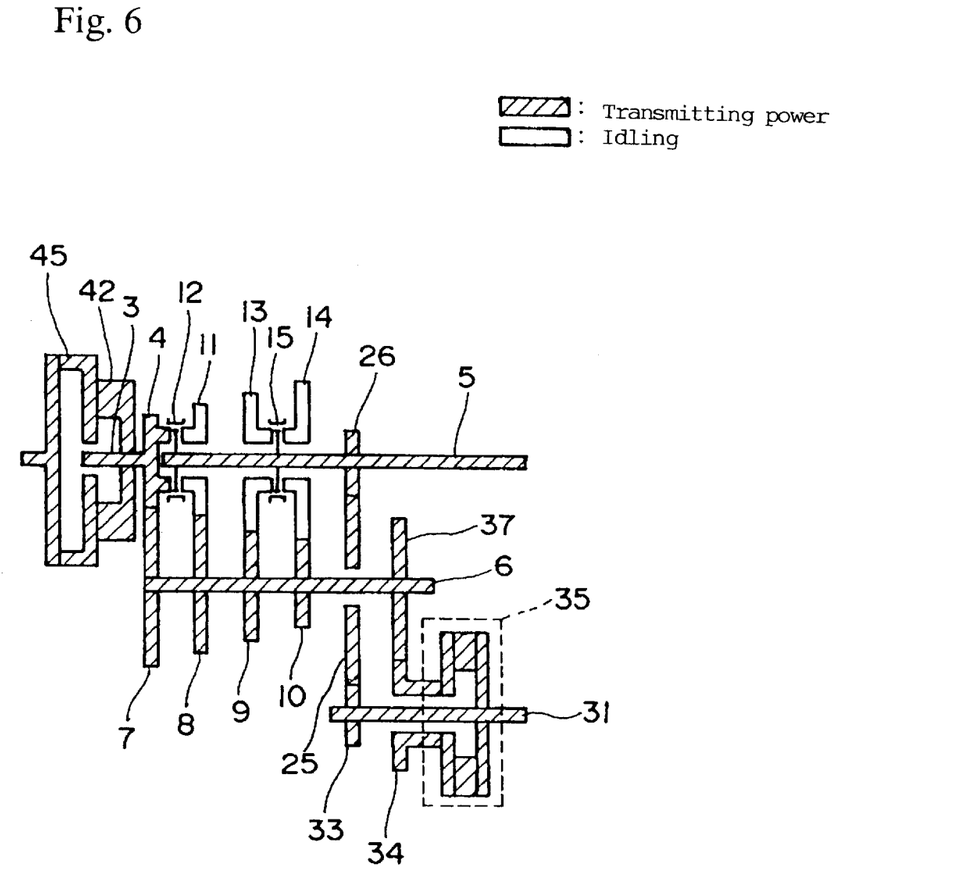
FIG. 6 is a view explaining the engaging and disengaging operation of the assist mechanism during shifting.
Figure 7:
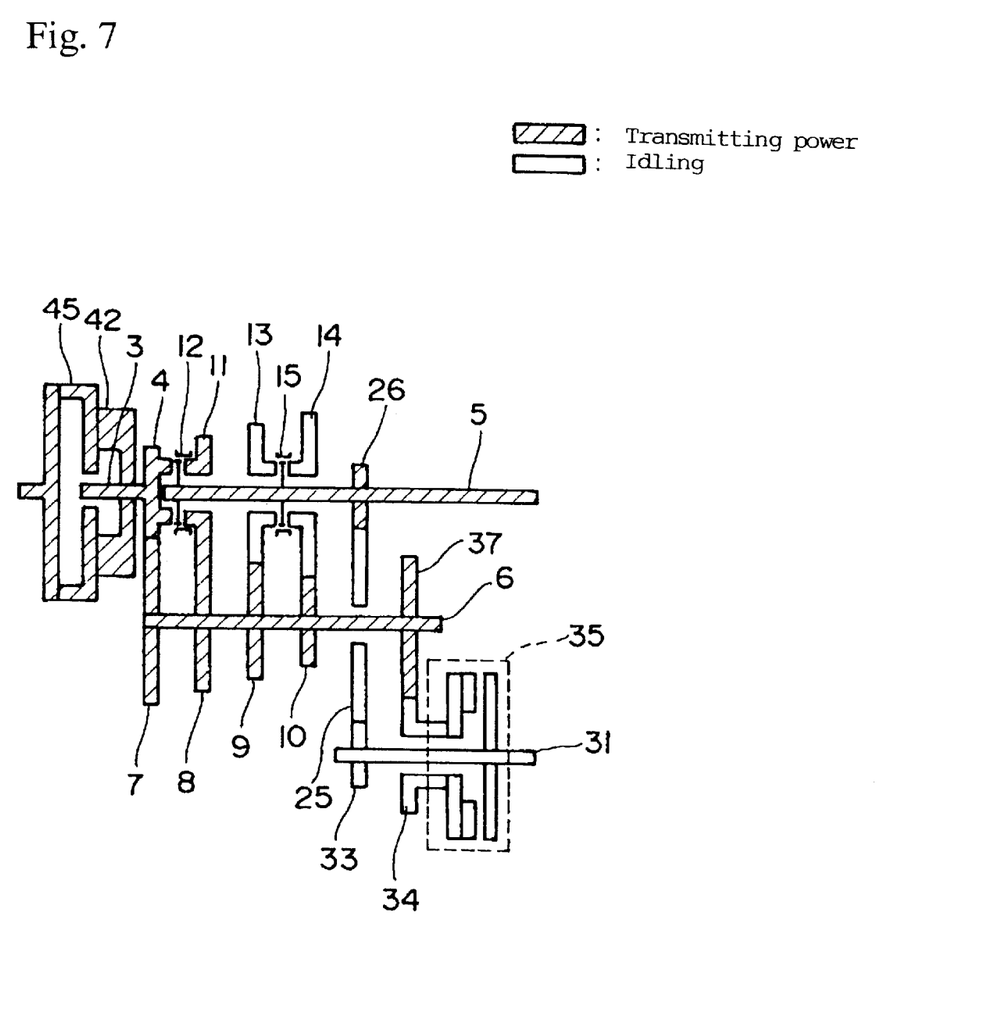
FIG. 7 is a view explaining the engaging and disengaging operation of the assist mechanism during shifting.

FIG. 1 is an overall structural view of the automatic transmission comprising an embodiment of the present invention, FIG. 2 is an enlarged view of the assist mechanism shown in FIG. 1, FIG. 3 is a right side view of the automatic transmission shown in FIG. 1, FIG. 4 is a view indicating the position where the automatic transmission according to the present invention is provided in a car body of an automobile, and FIG. 5 through FIG. 7 are views explaining the engaging and disengaging operation of the assist mechanism during shifting.

In FIG. 1, an automatic transmission 1 is stored inside a transmission case 2. In the transmission case 2, an input shaft 3 rotated by a starting clutch, which is not illustrated, is supported so as to rotate freely. A drive gear 4 is fixed to the end of the input shaft 3 at the rearward direction of the vehicle. Also, opposed to the drive gear 4, an output shaft 5 is provided so as to rotate freely on the extension of the input shaft 3 without contacting the drive gear 4, so that the axial center of the output shaft 5 coincides with the axial center of the input shaft 3.

Also, below the output shaft 5, a counter shaft 6 is supported so as to rotate freely, in parallel to the output shaft 5. A counter drive gear 7 is fixed to the side end of the counter shaft 6 at the frontward direction of the car body. The counter drive gear 7 meshes with the drive gear 4, and is constituted so that when the drive gear 4 rotates, the counter drive gear 7 rotates, and the counter shaft 6 rotates. The counter shaft 6 is fixed with a counter 3rd gear 8 to the rearward side of the car body at a predetermined interval, is fixed with a counter 2nd gear 9 to the rearward side of the car body at a predetermined interval from the counter 3rd gear 8, and is fixed with a counter 1st gear 10 to the rearward side of the car body at a predetermined interval from the counter 2nd gear 9.

The counter 3rd gear 8 is meshed with a 3rd gear 11, which is provided to the output shaft 5 so as to rotate freely. To the output shaft 5, there is provided a cogged clutch 12 between the 3rd gear 11 and the drive gear 4. The cogged clutch 12 is engaged to the output shaft 5. The cogged clutch 12 is constituted so as to slide freely on the output shaft 5, and engages the input shaft 3 with the output shaft 5 (the fourth speed position) by shifting the cogged clutch 12, or engages with the 3rd gear 11.

Also, the counter 2nd gear 9 is meshed with a 2nd gear 13, which is provided to the output shaft 5 so as to rotate freely. Moreover, the counter 1st gear 10 is meshed with a 1st gear 14, which is provided to the output shaft 5 so as to rotate freely. To the output shaft 5, there is engaged and provided a cogged clutch 15 between the 2nd gear 13 and the 1st gear 14. The cogged clutch 15 is constituted so as to slide freely on the output shaft 5, and engages the 2nd gear 13 with the output shaft 5 by shifting the cogged clutch 15 in the frontward direction of the car body, and engages the 1st gear 14 with the output shaft 5 by shifting the cogged clutch 15 in the rearward direction of the car body.

The operation of the cogged clutch 12 and the cogged clutch 15 is performed by moving a striking rod 18 via a striking arm 17, by operating the actuator of a shift select controller 30. The shift select controller 30 operates the switching of the shift gear selected from the accelerator command value output based on the accelerator pedal position of the driver, and the current speed of the automobile.

At the rearward side of the vehicle of the counter shaft 6 than an intermediate plate 19, there is fixed a reverse counter gear 20. The reverse counter gear 20 operates when the vehicle moves backward. The reverse counter gear 20 is meshed with a reverse idler gear 22 mounted to a reverse shaft 21 so as to rotate freely, and with a reverse gear 23. The reverse gear 23 is provided to the output shaft 5 so as to rotate freely. To the frontward of the vehicle from the reverse gear 23, a cogged clutch 24 is provided and engaged to the output shaft 5.

Furthermore, below the counter shaft 6, an assist shaft 31 is provided so as to rotate freely, in parallel to the counter shaft 6. The assist shaft 31 is provided so that the assist shaft 31 is deviated from the line A connecting the central axis of the output shaft 5 and the central axis of the counter shaft 6, and the central axis of the assist shaft 31 is positioned below the central axis of the counter shaft 6, as is shown in FIG. 3. And the location of the assist shaft 31 is formed so that it is positioned inside the transmission case 2 on the side provided with a gear oil injection hole 32, and is also positioned inside the range of 90 degrees from the central axis of the counter shaft 6 (third quadrant) relative to the line A connecting the central axis of the output shaft 5 and the central axis of the counter shaft 6.

Thus, by constituting the assist mechanism in the position within the range of 90 degrees to the lower left side from the axial center of the counter shaft 6 (third quadrant) relative to the connection A of the central axis, it is possible to locate the assist mechanism at the lowermost portion of the transmission case, and to mount the same without projecting into the room of the vehicle, enabling effective use of the inner space of the transmission case. Moreover, the cooling effect by the oil could be expected. Also, it could be mounted to a position without hindering the access to the gear oil injection hole.

Also, an assist output gear 33 is fixed to the assist shaft 31 at the frontward side of the car body, as is shown in FIG. 2. The assist output gear 33 rotates from the rotation of the assist shaft 31. The assist output gear 33 is meshed with a counter gear 25, which is the highest speed counter gear of the counter gears provided on the counter shaft 6. The counter gear 25 is provided so as to rotate freely to the counter shaft 6, and rotates from the rotation of the assist output gear 33, irrespective of the counter shaft 6.

And the counter gear 25 is meshed with an output gear 26, which is fixed to the output shaft 5. Thus, when the counter gear 25 rotates, the output shaft 5 rotates. The counter gear 25 is the highest speed counter gear of the counter gears provided on the counter shaft 6.

A rotary cylinder 36 of an assist clutch 35 is mounted to the assist shaft 31, coupled to the assist output gear 33 fixed to the assist shaft 31. The rotary cylinder 36 is rotationally supported to the assist shaft 31, and an assist input gear 34 is fixed to the external surface of the rotary cylinder 36. The assist input gear 34 is meshed with a counter assist gear 37, which is fixed to the counter shaft 6, and which rotates along with the counter shaft 6.

The rotary cylinder 36 is provided in a condition so as to rotate freely to the assist shaft 31. Also, the side end of the rotary cylinder 36 in the rearward direction of the car body is housed in the assist clutch 35. When the assist clutch 35 operates, the rotary cylinder 36 and the assist shaft 31 are engaged to transmit the rotation of the counter assist gear 37 to the output gear 26 via the assist input gear 34, the rotary cylinder 36, the assist shaft 31, the assist output gear 33, and the counter gear 25, and transmits the rotational force to the output shaft 5.

As seen from above, the counter gear 25 is provided so as to rotate freely to the counter shaft 6, and is driven by the rotation of the assist output gear 33 irrespective of the counter shaft 6. Also, the assist input gear 34 is fixed to the rotary cylinder 36 of the assist clutch 35 rotationally supported by the assist shaft 31. By operating the assist clutch 35 to engage the rotary cylinder 36 and the assist shaft 31, the rotation of the counter shaft 6 is transmitted to the assist shaft 31 via the counter assist gear 37, and to the output shaft 5 via the assist output gear 33, the counter gear 25, and the output gear 26. Therefore, the rotational force of the input shaft 3 could be assisted to the output shaft 5 by the operation of the assist clutch 35, when rotation of the input shaft 3 is not transmitted to the output shaft 5 in the period of disengagement of the currently engaged gear and engagement of a new gear during shifting. And, the shock originated in the period of disengagement of the currently engaged gear and engagement of the new gear during shifting could be eliminated.

The switching of the reverse gear 23 is performed by the cogged clutch 24. The cogged clutch 24 is constituted so as to slide freely on the output shaft 5. By shifting the cogged clutch 24 to the frontward direction of the car body, the reverse gear 23 is engaged to the output shaft 5. When the cogged clutch 24 is engaged to the reverse gear 23, the vehicle moves backward.

The automatic transmission 1 thus constituted is provided at the center of the car body 40 in the moving direction, as is shown in FIG. 4. In the drawing, reference number 41 denotes an indicator, 42 denotes the starting clutch, and 43 denotes the engine.

Next, the operation of the automatic transmission will be explained.

First, when the driver turns on the starting switch in the state where the range lever is in the parking (P) position or in the neutral (N) position, the starter motor rotates and starts the engine 43. When the driver moves the range lever to the drive range (D) position after starting of the engine 43, the shift select controller 30 operates the actuator under the command from the range lever, and shifts the cogged clutch 15 engaged to the output shaft 5 to the rearward direction of the vehicle, in order to engage with the 1st gear 14. With the engagement of the cogged clutch 15 with the 1st gear 14, the cogged clutch 15, the 1st gear 14 and the counter 1st gear 10 are meshed.

At this point, the rotation of the input shaft 3 is transmitted to the counter shaft 6 from the drive gear 4 via the counter drive gear 7 to rotate the counter shaft 6, and the rotation of the counter shaft 6 is transmitted to the 1st gear 14 via the counter 1st gear 10. The output shaft 5 rotates with the rotation of the 1st gear 14, thereby rotating the wheels.

In the state where the cogged clutch 15 is shifted to the rearward direction of the vehicle to engage with the 1st gear 14, the input shaft 3 is not rotating, so that the drive gear 4 fixed to the input shaft 3 does not rotate. Therefore, the counter drive gear 7 fixed to the counter shaft 6 meshed to the drive gear 4 does not rotate. Also, because the counter shaft 6 does not rotate, the counter 1st gear 10 fixed to the counter shaft 6 does not rotate.

When the driver operates the accelerator pedal, the starting clutch 42 is gradually engaged, in order to start rotation of the input shaft 3. The rotation of the input shaft 3 rotates the drive gear 4, which is transmitted to the counter drive gear 7 meshed to the drive gear 4 so as to rotate the counter shaft 6. The rotation of the counter shaft 6 rotates the counter 1st gear 10, which is transmitted to the 1st gear 14, so as to rotate the output shaft 5 engaged by the cogged clutch 15, thereby rotating the wheels.

When the driver depresses the accelerator pedal further, engine speed and the vehicle speed increases further. The accelerator command value corresponding to the accelerator pedal position is input to the control apparatus, in order to decide whether the gear position is the 1st gear 14 or the 2nd gear 13 from the accelerator command value and the vehicle speed. When it is determined as being within the range of the 2nd gear 13, a drive command is output from the control apparatus to the shift select controller 30. The actuator operates based on the drive command of the shift select controller 30, to shift the cogged clutch 15 engaged to the output shaft 5 to the frontward direction of the vehicle to disengage the mesh with the 1st gear 14, and to further shift the cogged clutch 15 to the frontward direction of the vehicle to engage with the 2nd gear 13. When shifting from the 1st gear 14 to the 2nd gear 13, the cogged clutch 15 becomes temporarily non-engaged between disengagement with the 1st gear 14 and the engagement with the 2nd gear 13. The assist mechanism operates in order to dissolve the shock of the driver during shifting.

When the driver depresses the accelerator pedal in order to increase speed, in the state where the starting clutch 42 is engaged, the rotation of the counter shaft 6 rotates the counter 1st gear 10 to rotate the output shaft 5, and the vehicle is running, the engine speed increases and the accelerator command value corresponding to the accelerator pedal position is input to the control apparatus. The control apparatus decides whether the gear position is the 2nd gear 13 or the 3rd gear 11 from the accelerator command value output from the accelerator pedal and the speed of the vehicle (vehicle speed). When it is decided as within the range of the 3rd gear 11, a drive command is output from the control apparatus to the shift select controller 30 to operate the actuator, and the cogged clutch 15 engaged to the output shaft 5 is shifted to disengage the mesh with the 2nd gear 13.

At the same time, the cogged clutch 12 engaged to the output shaft 5 in the non-engaged position is shifted to the rearward direction of the vehicle, to engage with the 3rd gear 11. With engagement of the cogged clutch 12 to the 3rd gear 11, the cogged clutch 12, the 3rd gear 11, and the counter 3rd gear 8 are meshed. Therefore, the rotation of the input shaft 3 rotates the counter shaft 6 from the drive gear 4 via the counter drive gear 7, and the rotation of the counter shaft 6 is transmitted to the 3rd gear 11 via the counter 3rd gear 8. The output shaft 5 rotates in proportion to the 3rd gear 11 with the rotation of the 3rd gear 11, resulting in high-speed rotation of the wheels, and increase in vehicle speed.

When the gear is shifted from the 1st gear 14 to the 2nd gear 13, the rotation of the input shaft 3 is transmitted to the counter shaft 6 from the drive gear 4 via the counter drive gear 7. The rotational force of the input shaft 3 transmitted to the counter shaft 6 is transmitted to the 2nd gear 13 meshing with the counter 2nd gear 9 via the counter 2nd gear 9, rotates the output shaft 5, and is provided to the wheels.

When shifting to the 2nd gear 13 or to the 3rd gear 11, there temporarily exists a non-engaged condition when neither of the 2nd gear 13 nor the 3rd gear 11 is engaged with the output shaft 5. The non-engaged condition is the condition when the engine output, that is, rotational force of the input shaft 3, is temporarily not transmitted to the output shaft 5. Therefore, under the non-engaged condition, the engine output is not transmitted to the output shaft 5 via the input shaft 3, so that the driver feels no acceleration from depressing the accelerator pedal, and the shock of temporary deceleration during shifting is originated. The assist mechanism operates in order to moderate the shock of the driver during shifting.

The assist mechanism at shifting when the gear is switched operates as is shown in FIG. 5 through FIG. 7. The case where the gear is switched from the 2nd gear 13 to the 3rd gear 11 will be explained below as an example.

FIG. 5 shows the condition where the cogged clutch 15 is engaged with the 2nd gear 13. In such state, the assist input gear 34 meshing with the counter assist gear 37 fixed to the counter shaft 6 is transmitted with the rotation of the counter shaft 6 via the counter assist gear 37, and rotates together with the rotary cylinder 36 of the assist clutch 35 fixed with the assist input gear 34. The rotary cylinder 36 is not engaged with the assist shaft 31, as is shown in FIG. 5, and is rotating above the assist shaft 31. The assist input gear 34 is constantly idling above the assist shaft 31, as long as the counter shaft 6 is rotating, so that the rotational force transmitted to the input shaft 3 from a flywheel 45 via the starting clutch 42 is not provided to the assist shaft 31.

When the operation command for shifting from the 2nd gear 13 to the 3rd gear 11 is output under such condition, the command for operating the assist clutch 35 is output, so that the assist clutch 35 operates and engages by pressing against the clutch plate with hydraulic pressure, as is shown in FIG. 6. With such operation, the rotary cylinder 36 of the assist clutch 35 fixed with the assist input gear 34 is engaged with the assist shaft 31, so that the rotation of the assist input gear 34 is transmitted to the assist shaft 31. FIG. 6 shows the non-engaged condition where the cogged clutch 15 is disengaged from both the 2nd gear 13 and the 3rd gear 11.

The rotation of the assist shaft 31 rotates the assist output gear 33 fixed to the assist shaft 31. The rotation of the assist output gear 33 is transmitted to the counter gear 25 meshing with the assist output gear 33. The counter gear 25 is constituted so as to rotate freely on the counter shaft 6, so that the counter gear 25 rotates irrespective of the counter shaft 6, and the rotation of the counter gear 25 is transmitted directly to the output gear 26 meshing with the counter gear 25, and to the output shaft 5 mounted with the output gear 26 via the output gear 26. Thus, the rotation of the counter shaft 6 is transmitted to the assist input gear 34 from the counter assist gear 37, the rotation of the counter shaft 6 transmitted to the assist input gear 34 is transmitted to the counter gear 25 by engagement of the assist input gear 34 and the assist shaft 31 via the assist shaft 31 through the assist output gear 33, and the rotation transmitted to the counter gear 25 is transmitted to the output gear 26 via the counter gear 25, to assist rotation of the output shaft 5 engaged with the output gear 26.

As is seen from above, even when the non-engaged condition where neither of the 2nd gear 13 nor the 3rd gear 11 is engaged temporarily exists during shifting from the 2nd gear 13 to the 3rd gear 11, the rotation transmitted to the input shaft 3 from the flywheel 45 via the starting clutch 42 is transmitted from the drive gear 4 via the counter drive gear 7, the counter shaft 6, the counter assist gear 37, the assist input gear 34, the assist shaft 31, the assist output shaft 33, the counter gear 25, the output gear 26, and the output shaft 5, with the operation of the assist clutch 35. Therefore, obstructing of operation of the drive force to the output shaft 5 during non-engaged condition at shifting could be prevented, so that the shock at shifting could be moderated.

After the assist mechanism performs assistance, the cogged clutch 15 is engaged with the 3rd gear 11, as is shown in FIG. 7. The rotation of the input shaft 3 is transmitted from the drive gear 4 to the counter shaft 6 via the counter drive gear 7, the rotation of the counter shaft 6 is transmitted to the 3rd gear 11 via the counter 3rd gear 8, and is provided to the output shaft 5 via the 3rd gear 11.

When the driver depresses the accelerator pedal further, the engine speed increases further and the accelerator command value corresponding to the accelerator pedal position is input to the control apparatus. The control apparatus decides whether the gear position is the 2nd gear 13 or the 3rd gear 11, from the accelerator command value output from the accelerator pedal and the speed of the vehicle (vehicle speed). When it is decided as within the range of the 3rd gear 11, a drive command is output from the control apparatus to the shift select controller 30 to operate the actuator, and the cogged clutch 15 engaged to the output shaft 5 is shifted to disengage the mesh with the 2nd gear 13.

At the same time, the cogged clutch 12 engaged to the output shaft 5 in the non-engaged position is shifted to the rearward direction of the vehicle, to engage with the 3rd gear 11. With crank of the cogged clutch 12 to the 3rd gear 11, the cogged clutch 12, the 3rd gear 11, and the counter 3rd gear 8 are meshed. Therefore, the rotation of the input shaft 3 rotates the counter shaft 6 from the drive gear 4 via the counter drive gear 7, and the rotation of the counter shaft 6 is transmitted to the 3rd gear 11 via the counter 3rd gear 8. The output shaft 5 rotates in proportion to the 3rd gear 11 with the rotation of the 3rd gear 11, resulting in high-speed rotation of the wheels, and increase in vehicle speed.

When shifting to the 2nd gear 13 or to the 3rd gear 11, there temporarily exists a non-engaged condition when neither of the 2nd gear 13 nor the 3rd gear 11 is engaged with the output shaft 5. The non-engaged condition is the condition when the engine output, that is, rotational force of the input shaft 3, is temporarily not transmitted to the output shaft 5. Therefore, under the non-engaged condition, the engine output is not transmitted to the output shaft 5 via the input shaft 3, so that the driver feels no acceleration from depressing the accelerator pedal, and the shock of temporary deceleration during shifting is originated. The assist mechanism operates in order to moderate the shock of the driver during shifting.

When the assist mechanism operates and the assist clutch 6 operates during shifting, the assist input gear 34 is engaged with the assist shaft 31, and the rotation of the assist input gear 34 is transmitted to the assist shaft 31. With the rotation of the assist shaft 31, the assist output gear 33 fixed to the assist shaft 31 rotates, and the rotation of the assist output gear 33 is transmitted to the counter gear 25 meshed with the assist output gear 33. The counter gear 25 is constituted so as to rotate freely on the counter shaft 6.

The rotation of the counter gear 25 is transmitted to the output gear 26 meshing with the counter gear 25, and is transmitted to the output shaft 5 mounted with the output gear 26. As is seen from above, the rotation of the counter shaft 6 is transmitted to the assist input gear 34 from the counter assist gear 37, and the rotation of the counter shaft 6 transmitted to the assist input gear 34 is transmitted to the output gear 26 via the assist shaft 31 by the engagement of the assist input gear 34 and the assist shaft 31, and from the assist output gear 33 via the counter gear 25 to the output gear 26, in order to assist rotation of the output shaft 5.

As is seen from above, even when the non-engaged condition where neither of the 2nd gear 13 nor the 3rd gear 11 is engaged temporarily exists during shifting from the 2nd gear 13 to the 3rd gear 11, the rotation of the input shaft 3 is transmitted from the drive gear 4 via the counter drive gear 7, the counter shaft 6, the counter assist gear 37, the assist input gear 34, the assist shaft 31, the assist output shaft 33, the counter gear 25, the output gear 26, and the output shaft 5, with the operation of the assist clutch 35. Therefore, obstructing of operation of the drive force to the output shaft 5 during non-engaged condition at shifting could be prevented, so that the shock at shifting could be moderated.

When the driver attempts to increase the speed by depressing the accelerator pedal further, the engine speed increases, and the increased speed increases the rotation of the counter shaft 6 via the drive gear 4. When the speed of the vehicle (vehicle speed) reaches the limit of driving in 3rd gear 11, the control apparatus detects that the gear position is within the range of the 4th gear 4 (drive gear) from the accelerator command value and the vehicle speed, and outputs the drive command from the control apparatus to the shift select controller 30. By operating the actuator, the cogged clutch 12 engaged to the output shaft 5 is shifted to the frontward direction of the vehicle to disengage the mesh with the 3rd gear 11, and the cogged clutch 12 is shifted further to the frontward direction of the vehicle to engage with the 4th gear 4 (drive gear). When the gear is shifted from the 3rd gear 11 to the 4th gear 4 (drive gear), the rotation of the input shaft 3 is transmitted directly to the output shaft 5 from the drive gear 4, so that the output shaft 5 is rotated by the rotation of the input shaft 3 itself.

When the driver slackens the accelerator pedal when the shift gear is in the position of the 3rd gear 11, the speed of the vehicle lowers, and vehicle speed is slowed down. Then, the control apparatus detects that the gear position entered the range of the 2nd gear 13 from the range of the 3rd gear 11, from the accelerator command value and the vehicle speed, and outputs drive command from the control apparatus to the shift select controller 30. By operating the actuator, the cogged clutch 12 engaged to the output shaft 5 is shifted to the frontward direction of the vehicle to disengage the mesh with the 3rd gear 11. At the same time, the cogged clutch 15 engaged to the output shaft 5 and in a position of non-engagement is shifted to the frontward direction of the vehicle to engage with the 2nd gear 13. With the engagement of the cogged clutch 15 with the 2nd gear 13, the cogged clutch 15, the 2nd gear 13, and the counter 2nd gear 9 are meshed.

Therefore, the rotation of the input shaft 3 rotates the counter shaft 6 from the drive gear 4 via the counter drive gear 7, and the rotation of the counter shaft 6 is transmitted to the 2nd gear 13 via the counter 2nd gear 9. With the rotation of the 2nd gear 13, the output shaft 5 rotates in proportion to the 2nd gear 13 with the rotation of the 2nd gear 13, so that vehicle speed is slowed down. When the speed of the vehicle is lowered from the slacking of the accelerator pedal by the driver, in the condition where the gear is the 3rd gear 11, shifting is performed under slow-down of the vehicle speed so that there exists no shock from shifting, even when there is originated a temporary non-engaged condition during switching from the 3rd gear 11 to the 2nd gear 13. Therefore, the assist mechanism does not perform assistance.

When the driver slackens the accelerator pedal further after the shift gear is shifted to the 2nd gear 13, the speed of the vehicle lowers further, and vehicle speed is slowed down further. Then, the control apparatus detects that the gear position entered the range of the 1st gear 14 from the range of the 2nd gear 13, from the accelerator command value and the vehicle speed, and outputs drive command from the control apparatus to the shift select controller 30. By operating the actuator, the cogged clutch 15 engaged to the output shaft 5 is shifted to the rearward direction of the vehicle to disengage the mesh with the 2nd gear 13. Then, the cogged clutch 15 is shifted to the rearward direction of the vehicle to engage with the 1st gear 14.

During shifting from the 2nd gear 13 to the 1st gear 14, the speed of the vehicle is lowered by the slacking of the accelerator pedal by the driver, as is the case with shifting from the 3rd gear 11 to the 2nd gear 13, so that there exists no shock from shifting, even when there is originated a temporary non-engaged condition during shifting from the 2nd gear 13 to the 1st gear 14. Therefore, the assist mechanism does not perform assistance.

According to the embodiment of the present invention, the assist mechanism assists the rotation to the output shaft 5 under the non-engaged condition during shifting from the 1st gear to the 2nd gear, from the 2nd gear to the 3rd gear, from the 3rd gear to the 4th gear, and from the 4th gear to the 5th gear, so that the accelerating power is transmitted to the output shaft 5 during accelerated but non-engaged condition, resulting in moderating the shock the driver feels as if the vehicle has decelerated. That is, even when a mesh type transmission provided with a clutch for engaging and disengaging the shift gear with the output shaft is used, the shock originated from engagement and disengagement of the clutch during acceleration could be moderated.

Also, according to the present embodiment, a mesh type transmission for transmitting power of the input shaft 3 to the output shaft 5 by engaging the plurality of cogged clutches 12, 15 with the plurality of shift gears 11, 13, 14 is used, and the automatic transmission, which performs automatic shifting by controlling engagement of the plurality of cogged clutches 12, 15 for engaging and disengaging the voluntary shift gears 11, 13, 14 with the output shaft 5 to the shift gear determined from the accelerator command value and the vehicle speed, is provided with the assist mechanism for transmitting rotational force of the input shaft 3 to the output shaft 5, when no cogged clutch is engaged with any of above-mentioned plurality of shift gears during switching of the cogged clutch. Therefore, the shock originated from engaging and disengaging of the clutch during acceleration could be moderated.

Moreover, according to the present embodiment, a mesh type automatic transmission equipped with the plurality of shift gears 11, 13, 14 provided so as to rotate freely to the output shaft 5 for providing driving force to the wheels, the plurality of cogged clutches 12, 15 engaging with the output shaft 5, and the plurality of counter shift gears 8, 9, 10 corresponding to each speed, which are fixed to the counter shaft 6 rotated by the rotation of the input shaft 3 rotated from the power of the engine 43, and which mesh with the plurality of shift gears 11, 13, 14, for performing automatic shifting by controlling engagement of one of the plurality of cogged clutches 12, 15 with the voluntary shift gears 11, 13, 14 of the plurality of shift gears 11, 13, 14 determined from the accelerator command value and the vehicle speed, is used. The automatic transmission is provided with the assist mechanism for assisting the transmission of the rotational force of the input shaft 3 to the output shaft 5 via the assist shaft 31 which rotates from the rotation of the counter shaft 6, during non-engagement when no cogged clutch of the plurality of cogged clutches 12, 15 is engaged with any of the plurality of shift gears 11, 13, 14, occurring during switching when an engaged cogged clutch of the plurality of cogged clutches 12, 15 is disengaged and one of the cogged clutch of the plurality of cogged clutches 12, 15 is to be engaged. Therefore, during non-engagement when the cogged clutch and the shift gear is disengaged at switching of the shift gear, the rotation of the input shaft 3 (counter shaft 6) could be assisted to the output shaft 5, so that shock originated by engaging and disengaging of clutch during acceleration could be moderated, even when a mesh type transmission provided with clutches for engaging and disengaging the shift gears 301, 303, 304, 306, 310 with the output shaft 5 is used.

Furthermore, according to the present embodiment, the assist mechanism is provided so that the assist shaft 31 is deviated from the line connecting the central axis of the counter shaft 6 rotating from the power of the input shaft 3, and the central axis of the output shaft 5, which is engaged with the plurality of cogged clutches 12, 15, which is fitted with the plurality of shift gears 11, 13, 14 so as to rotate freely, and which outputs rotation of the counter shaft 6 with gear shifted according to need, and provided so that the central axis of the assist shaft 31 is provided below the central axis of the counter shaft 6. Therefore, the assist mechanism could be provided to the lowermost portion of the transmission case 2, enabling effective use of the inner space of the transmission case 2, as well as enabling easy installation of the transmission case 2 on the vehicle without design change and without projecting into the room of the vehicle.

Still further, according to the present embodiment, the position for providing the assist mechanism, which transmits the rotational force of the input shaft 3 to the output shaft 5 by the assist shaft 31, by transmitting the rotation of the counter shaft 6 to the assist shaft 31 via the assist input gear 34, in the period of disengagement of the currently engaged gear to engagement of the new gear during changing of the plurality of shift gears 11, 13, 14, is provided so that the position of the assist shaft 31 is in the opposite side of the output shaft 5 relative to the horizontal axis passing the center of the counter shaft 6, so that it is possible to provide the assist mechanism without interference with the output shaft 5 inside the transmission case 2.

Still further, according to the present embodiment, the position for providing the assist mechanism, which transmits the rotational force of the input shaft 3 to the output shaft 5 by the assist shaft 31, by transmitting the rotation of the counter shaft 6 to the assist shaft 31 via the assist input gear 34, in the period of disengagement of the currently engaged gear to engagement of the new gear during changing of the plurality of shift gears 11, 13, 14, is in the opposite side of the engine and the starting clutch, based on the position of the counter shaft 6, so that the assist mechanism could be provided to the lowermost portion of the transmission case 2, enabling effective use of the inner space of the transmission case 2, as well as enabling easy installation of the transmission case 2 to the vehicle without design change of the transmission case 2, and without projecting into the room of the vehicle.

Still further, according to the present embodiment, the assist mechanism for transmitting the rotational force of the input shaft 3 to the output shaft 5 by the assist shaft 31, by transmitting the rotation of the counter shaft 6 to the assist shaft 31 via the assist input gear 34, in the period of disengagement of the currently engaged gear to engagement of the new gear during changing of the plurality of shift gears 11, 13, 14, is provided so that the position of the assist shaft 31 is on the opposite side of the output shaft relative to the horizontal line passing the center of the counter shaft 6, and so that it is positioned also on the opposite side of the engine and the starting clutch, based on the position of the counter shaft 6. Therefore, the assist mechanism could be provided to the lowermost portion of the transmission case 2, enabling effective use of the inner space of the transmission case 2, enabling easy installation of the transmission case 2 to the vehicle without design change of the transmission case 2 and without projecting into the room of the vehicle, so that it is possible to provide the assist mechanism without interference with the output shaft 5 inside the transmission case 2.

Furthermore, according to the present embodiment, the assist mechanism is so provided that the assist mechanism starts engaging when the switch command is output to one of the cogged clutches 12, 15 before the cogged clutch currently engaged with one of the shift gear of the plurality of shift gears 11, 13, 14 is completely disengaged from the engaged shift gear of the plurality of shift gears 11, 13, 14, engages corresponding to the torque of the engine and transmits rotational power of the input shaft 3 to the output shaft 5, when one of the cogged clutches 12, 15 is completely disengaged from any of the engaged shift gear of the plurality of shift gears 11, 13, 14, and disengages when the cogged clutch is engaged to the shift gear to be engaged based on the switch command. Therefore, the clutch operates before the cogged clutch is disengaged from the shift gear to assist until the cogged clutch newly meshing with a different shift gear is engaged, so that the shock originated at engagement and disengagement of the clutch during acceleration could be moderated.

Still further, according to the present embodiment, the assist mechanism is comprised of the assist shaft 31 rotating from the rotational force of the counter shaft 6, the assist input gear 34 meshed with the assist output gear 33 fixed to the counter shaft 6, and mounted to the assist shaft 31 so as to rotate freely, the assist output gear 33 meshed with the counter gear 25 of the highest gear which is mounted to the counter shaft 6 so as to rotate freely, and fixed to the assist shaft 31, and the assist clutch 35 for engaging the assist input gear 34 with the counter shaft 6, and is constituted so as to transmit the rotation of the assist input gear 34 to the output shaft via the assist shaft 31 and the assist output gear 33, based on the assist command, so that the shock originated at engagement and disengagement of the clutch during acceleration could be moderated.

As is mentioned above, the present invention moderates the shock originated from engaging and disengaging of the clutch during acceleration.

We claim:

1. A mesh type transmission for transmitting power of an input shaft to an output shaft by engaging a plurality of cogged clutches with a plurality of shift gears, said transmissions being an automatic transmission for performing automatic shifting by controlling engagement of said plurality of cogged clutches for engaging and disengaging a voluntary shift gear with said output shaft, comprising
an assist mechanism arranged to transmit rotational force of said input shaft to said output shaft, in the period when no cogged clutch is engaged with any of said plurality of shift gears, during switching of one of said cogged clutches.

2. A mesh type automatic transmission, comprising an output shaft for outputting drive force, a plurality of shift gears, a plurality of cogged clutches, an input shaft for introducing power of an engine, a counter shaft, and a plurality of counter gears arranged to transmit rotation of said counter shaft being rotated by said input shaft which is rotated by said engine to said output shaft via said counter gears with automatic shifting by engaging one of said cogged clutches with selected ones of said plurality of shift gear corresponding to speed, and     an assist mechanism arranged to transmit rotational force of said input shaft to said output shaft by an assist shaft, by transmitting rotation of said counter shaft to said assist shaft via an assist gear, in the period when one of said plurality of shift gears is disengaged and a new gear of said plurality of shift gears is to be engaged during said shifting.

3. An automatic transmission according to claim 2, wherein said assist mechanism is provided so that said assist shaft is deviated from a line connecting a central axis of said counter shaft rotated by the power of said input shaft, with a central axis of said output shaft which is engaged with said plurality of cogged clutches, is fit with said plurality of shift gears so as to rotate freely, and which outputs rotation of said counter shaft with gear shifted according to need, and a central axis of said assist shaft is positioned below said central axis of said counter shaft.

4. An automatic transmission according to claim 3, wherein said assist mechanism starts engaging when a switch command for said cogged clutch is output, before said cogged clutch currently engaged with said shift gear is completely disengaged, engages according to torque of said engine and transmits rotational force of said input shaft to said output shaft, when said cogged clutch is completely disengaged from an already engaged shift gear, and disengages when said cogged clutch is engaged with said shift gear to be engaged based on said switch command.

5. An automatic transmission according to claim 3, wherein said assist mechanism comprises said assist shaft rotating from the rotational force of said counter shaft, an assist input gear meshing with a counter assist gear fixed to said counter shaft and being mounted to said assist shaft so as to rotate freely, an assist output gear meshing with said counter gear of the highest gear mounted to said counter shaft so as to rotate freely and being fixed to said assist shaft, and an assist clutch for engaging said assist input gear with said counter shaft, said assist mechanism being arranged to transmit rotation of said assist input gear to said output shaft via said assist shaft and said assist output gear, based on an assist command.

6. An automatic transmission according to claim 2, wherein said assist mechanism starts engaging when a switch command for said cogged clutch is output, before said cogged clutch currently engaged with said shift gear is completely disengaged, engages according to torque of said engine and transmits rotational force of said input shaft to said output shaft, when said cogged clutch is completely disengaged from an already engaged shift gear, and disengages when said cogged clutch is engaged with said shift gear to be engaged based on said switch command.

7. An automatic transmission according to claim 6, wherein said assist mechanism comprises said assist shaft rotating from the rotational force of said counter shaft, an assist input gear meshing with a counter assist gear fixed to said counter shaft and being mounted to said assist shaft so as to rotate freely, an assist output gear meshing with said counter gear of the highest gear mounted to said counter shaft so as to rotate freely and being fixed to said assist shaft, and an assist clutch for engaging said assist input gear with said counter shaft, said assist mechanism transmitting rotation of said assist input gear to said output shaft via said assist shaft and said assist output gear, based on an assist command.

8. An automatic transmission according to claim 2, wherein said assist mechanism comprises said assist shaft rotating from the rotational force of said counter shaft, an assist input gear meshing with a counter assist gear fixed to said counter shaft and being mounted to said assist shaft so as to rotate freely, an assist output gear meshing with said counter gear of the highest gear mounted to said counter shaft so as to rotate freely and being fixed to said assist shaft, and an assist clutch for engaging said assist input gear with said counter shaft, said assist mechanism transmitting rotation of said assist input gear to said output shaft via said assist shaft and said assist output gear, based on an assist command.

9. A mesh type automatic transmission, comprising and output shaft for outputting drive force to a plurality of wheels, a plurality of shift gears, a plurality of cogged clutches, an input shaft for introducing power of an engine, a counter shaft, and a plurality of counter gears arranged to transmit rotation of said counter shaft rotated by said input shaft which is rotated by said engine to said output shaft via said counter gear with automatic shifting by engaging one of said cogged clutches with a selected one of said plurality of shift gears corresponding to speed, and     an assist mechanism provided inside a transmission case on a side of a gear oil injection hole for transmitting rotational force of said input shaft to said output shaft by an assist shaft, by transmitting rotation of said counter shaft to said assist shaft via said assist gear, in the period when one of said plurality of shift gears is disengaged and a new gear of said plurality of shift gears is to be engaged during said shifting, wherein said assist shaft is positioned below a line perpendicular to a line connecting a central axis of said output shaft with a central axis of said counter shaft at the center of said output shaft.

10. An automatic transmission according to claim 9, wherein said assist mechanism starts engaging when a switch command for said cogged clutch is output, before said cogged clutch currently engaged with said shift gear is completely disengaged, engages according to torque of said engine and transmits rotational force of said input shaft to said output shaft, when said cogged clutch is completely disengaged from an already engaged shift gear, and disengages when said cogged clutch is engaged with said shift gear to be engaged based on said switch command.

11. An automatic transmission according to claim 9, wherein said assist mechanism comprises said assist shaft rotating from the rotational force of said counter shaft, an assist input gear meshing with a counter assist gear fixed to said counter shaft and being mounted to said assist shaft so as to rotate freely, an assist output gear meshing with said counter gear of the highest gear mounted to said counter shaft so as to rotate freely and being fixed to said assist shaft, and an assist clutch for engaging said assist input gear with said counter shaft, said assist mechanism being arranged to transmit rotation of said assist input gear to said output shaft via said assist shaft and said assist output gear, based on an assist command.

12. A mesh type automatic transmission, comprising an output shaft for outputting a drive force to a plurality of wheels, a plurality of shift gears, a plurality of cogged clutches, an input shaft for introducing power of an engine, a counter shaft, and a plurality of counter gears, for transmitting rotation of said counter shaft being rotated by rotation of said input shaft which is rotated by the power of said engine, to said output shaft via said counter gear with automatic shifting, by engaging said cogged clutch with a shift gear corresponding to speed, and an assist mechanism arranged to transmit rotational force of said input shaft to said output shaft by an assist shaft, by transmitting rotation of said counter shaft to said assist shaft via an assist gear, in the period when one of said plurality of shift gears is disengaged and a new gear of said plurality of shift gears is to be engaged during said shifting, wherein said assist shaft is positioned on an opposite side of said output shaft relative to a horizontal line passing the center of said counter shaft.

13. An automatic transmission according to claim 12, wherein said assist mechanism starts engaging when a switch command for said cogged clutch is output, before said cogged clutch currently engaged with said shift gear is completely disengaged, engages according to torque of said engine and transmits rotational force of said input shaft to said output shaft, when said cogged clutch is completely disengaged from an already engaged shift gear, and disengages when said cogged clutch is engaged with said shift gear to be engaged based on said switch command.

14. An automatic transmission according to claim 12, wherein said assist mechanism comprises said assist shaft rotating from the rotational force of said counter shaft, an assist input gear meshing with a counter assist gear fixed to said counter shaft and being mounted to said assist shaft so as to rotate freely, an assist output gear meshing with said counter gear of the highest gear mounted to said counter shaft so as to rotate freely and being fixed to said assist shaft, and an assist clutch for engaging said assist input gear with said counter shaft, said assist mechanism being arranged to transmit rotation of said assist input gear to said output shaft via said assist shaft and said assist output gear, based on an assist command.

15. A mesh type automatic transmission, comprising an output shaft for outputting drive force to a plurality of wheels, a plurality of shift gears, a plurality of cogged clutches, an input shaft for introducing power of an engine, a counter shaft, and a plurality of counter gears arranged to transmit rotation of said counter shaft being rotated by said input shaft which is rotated by said engine to said output shaft via said counter gear with automatic shifting by engaging said cogged clutch with a shift gear corresponding to speed, and an assist mechanism arranged to transmit rotational force of said input shaft to said output shaft by an assist shaft, by transmitting rotation of said counter shaft to said assist shaft via an assist gear, in the period when one of said plurality of shift gears is disengaged and a new gear of said plurality of shift gears is to be engaged during said shifting, said assist mechanism being positioned opposite to the side of an engine and a starting clutch based on a position of said counter shaft.

16. An automatic transmission according to claim 15, wherein said assist mechanism starts engaging when a switch command for said cogged clutch is output, before said cogged clutch currently engaged with said shift gear is completely disengaged, engages according to torque of said engine and transmits rotational force of said input shaft to said output shaft, when said cogged clutch is completely disengaged from an already engaged shift gear, and disengages when said cogged clutch is engaged with said shift gear to be engaged based on said switch command.

17. An automatic transmission according to claim 15, wherein said assist mechanism comprises said assist shaft rotating from the rotational force of said counter shaft, an assist input gear meshing with a counter assist gear fixed to said counter shaft and being mounted to said assist shaft so as to rotate freely, an assist output gear meshing with said counter gear of the highest gear mounted to said counter shaft so as to rotate freely and being fixed to said assist shaft, and an assist clutch for engaging said assist input gear with said counter shaft, said assist mechanism transmitting rotation of said assist input gear to said output shaft via said assist shaft and said assist output gear, based on an assist command.

18. A mesh type automatic transmission, comprising an output shaft for outputting drive force to a plurality of wheels, a plurality of shift gears, a plurality of cogged clutches, an input shaft for introducing power of an engine, a counter shaft, and a plurality of counter gears arranged to transmit rotation of said counter shaft being rotated by said input shaft which is rotated by said engine to said output shaft via said counter gear with automatic shifting by engaging said cogged clutch with a shift gear corresponding to speed, and as assist mechanism arranged to transmit rotational force of said input shaft to said output shaft by an assist shaft, by transmitting rotation of said counter shaft to said assist shaft via an assist gear, in the period when one of said plurality of shift gears is disengaged and a new gear of said plurality of shift gears is to be engaged during said shifting, said assist shaft being provided on an opposite side of said output shaft relative to a horizontal axis passing the center of said counter shaft, as well as to a position opposite to the side of an engine and a starting clutch, based on a position of said counter shaft.

19. An automatic transmission according to claim 18, wherein said assist mechanism starts engaging when a switch command for said cogged clutch is output, before said cogged clutch currently engaged with said shift gear is completely disengaged, engages according to torque, of said engine and transmits rotational force of said input shaft to said output shaft, when said cogged clutch is completely disengaged from an already engaged shift gear, and disengages when said cogged clutch is engaged with said shift gear to be engaged based on said switch command.

20. An automatic transmission according to claim 18, wherein said assist mechanism comprises said assist shaft rotating from the rotational force of said counter shaft, an assist input gear meshing with a counter assist gear fixed to said counter shaft and being mounted to said assist shaft so as to rotate freely, an assist output gear meshing with said counter gear of the highest gear mounted to said counter shaft so as to rotate freely and being fixed to said assist shaft, and an assist clutch for engaging said assist input gear with said counter shaft, said assist mechanism transmitting rotation of said assist input gear to said output shaft via said assist shaft and said assist output gear, based on an assist command.

* * * * *